Jan. 21, 1969     H. THOMAS, JR     3,422,486
AUTOMOTIVE VEHICLE DOOR HINGE COVER MEMBER
Filed May 23, 1966

HENRY THOMAS JR.
INVENTOR.

BY William L. Fisher
HIS ATTORNEY

# United States Patent Office 3,422,486
Patented Jan. 21, 1969

3,422,486
AUTOMOTIVE VEHICLE DOOR HINGE
COVER MEMBER
Henry Thomas, Jr., 16275 Kennedy,
Roseville, Mich. 48066
Filed May 23, 1966, Ser. No. 552,309
U.S. Cl. 16—148                                    1 Claim
Int. Cl. E05d 11/00

ABSTRACT OF THE DISCLOSURE

An automotive vehicle door hinge cover member is disclosed for use on an automotive vehicle exterior side door hinge, said hinge having a pair of forward and rearward hinge arms extending outwardly from the vehicle body and a hinge pin pivotally joining said hinge arms and forming a hinge joint exterior of the vehicle, the forward hinge arm stationary and the rearward hinge arm moveable with the vehicle door, said hinge cover member constructed to be detachably affixed to the forward hinge arm when the vehicle door is opened and so that it cannot be removed therefrom when the vehicle door is closed, said hinge cover member having a main panel which covers the front face of said forward hinge arm, the inner edge of said main panel contoured to conform to the exterior of the vehicle body over the height of said hinge cover member, the outer portion of said main panel extending arcuately outwardly and rearwardly to cover the front half of said hinge joint, said hinge cover member having top and bottom panels integral with said main panel and at right angles thereto which cover at least in part the top and bottom faces, respectively, of said forward hinge arm, a rearwardly extending bend-over fastener spring clip on each of said top and bottom panels for detachably fastening said hinge cover member to said forward hinge arm, said main panel having forwardly projecting pressure spring clips which prevent rattling of said hinge cover member when in place on said forward hinge arm covering the front face of said forward hinge arm and the front half of said hinge joint.

My invention relates to automotive vehicle exterior side door hinges.

The principal object of my invention is to provide cover means for the exposed hinge joints of such hinges which protect such hinges and lubricating material therefor from the elements including foreign matter; which protect the clothing of users of the automobile from being stained from brushing up against such hinges; which reduces the amount and frequency of lubrication required for such hinges; which increases the life and enhances the operation of such hinges; and which means themselves are a thing of beauty and constitute pleasing appearance automotive trim.

The foregoing object of my invention and its advantages will become apparent during the course of the following description, taken in conjunction with the accompanying drawings, in which.

Figure 2:
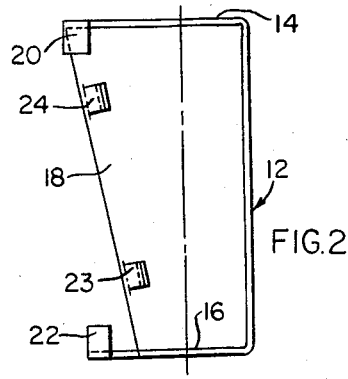
FIG. 2 is a rear elevational view of said embodiment with the fastening clips thereof shown in their installed positions.
Figure 1:
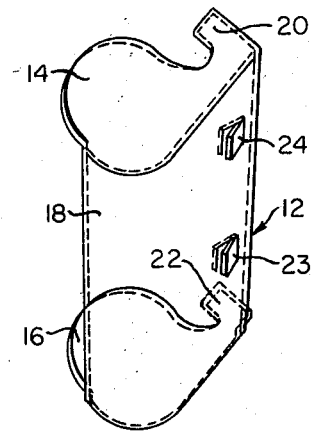
FIG. 1 is a perspective view of an automotive vehicle side door hinge cover embodying my invention.
Figure 3:
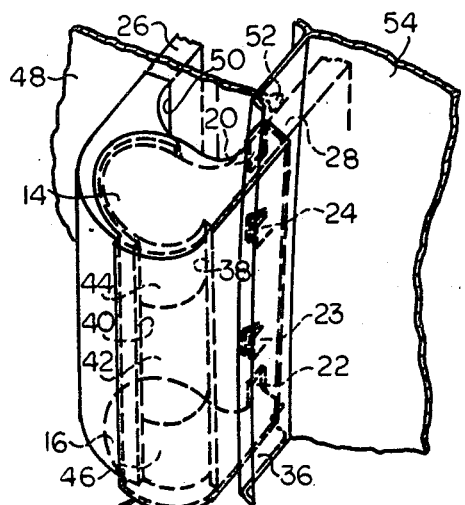
FIG. 3 is a perspective view with parts cut away of said embodiment shown attached to such an automotive vehicle exterior side door hinge.
Figure 4:
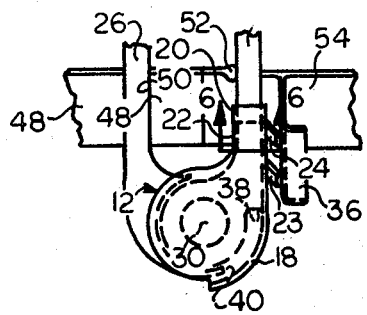
FIG. 4 is a top plan view of the structure of FIG. 3.
Figure 7:
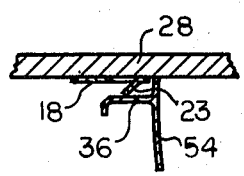
FIG. 7 is a fragmentary sectional view of the structure of FIG. 5 taken on the line 7—7 thereof.
Figure 5:
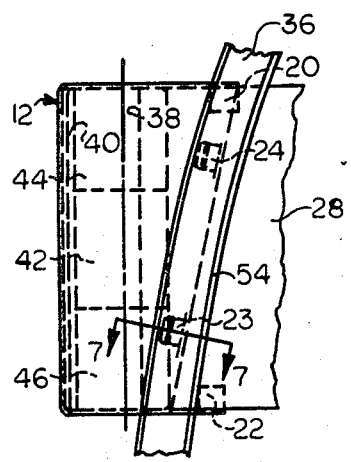
FIG. 5 is a front elevational view of the structure of FIG. 3.
Figure 6:
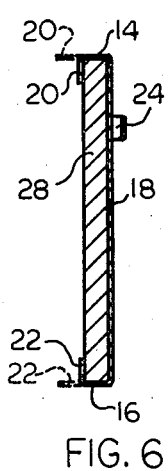
FIG. 6 is a vertical sectional view of the structure of FIG. 4 taken along the line 6—6 thereof.

Referring to the drawings in greater detail, the automotive vehicle exterior side door hinge shown therein is an upper right side hinge and has a movable hinge arm 26 protruding through an opening 50 in the outside of the vehicle door 48 and a stationary hinge arm 28 protruding between the door 48 and the vehicle body 54. As a part of the vehicle construction a seal 52 is provided between the inner vertical edge of the vehicle door 48 and the vehicle body 54. The hinge arm 26 is anchored to the vehicle door 48 by suitable means (not shown) and the hinge arm 28 is anchored to a pillar (not shown) within the interior of the car body by suitable means (not shown). A hinge pintle 30 is held in the hinge fingers 44 and 46 of the hinge arm 28 and rotatably supports the hinge finger 42 of the hinge arm 26. These hinge fingers form hinge joints on the forward side of the vehicle door hinge as shown. The vehicle door hinge is constructed with cooperating shoulders 38 and 40 on the hinge arms 26 and 28, respectively, which abut in an extreme open position of the door 48 and could thus serve as a secondary door check means. A primary door check for the vehicle door exclusive of the door hinges is otherwise built into the vehicle as a part of the vehicle body and door construction. In the closed position of the door the shoulders 38 and 40 are separated approximately 90 degrees about the center of the hinge and leave a hinge joint area which is exposed to wind blast, road dust, water spray and other elements.

An automotive vehicle side door hinge cover, which is generally designated 12, has substantially circular top and bottom panels 14 and 16, respectively, connected together by a main panel 18 at right angles to the top and bottom panels 14 and 16, all of which panels are constructed as one piece including a fastening clip 20 at the top and another fastening clip 22 at the bottom of the hinge cover 12. The clips 20 and 22, respectively, are integral parts of the top and bottom panels 14 and 16 and lie in the same respective planes thereof in their uninstalled positions. The main panel 18 has two pressure clips 23 and 24 constructed to be bent forwardly from such main panel 18. The main panel 18 is made so that its inner edge which adjoins the automobile body 54 closely follows the side contour thereof.

The hinge cover 12 is adapted and intended to be mounted on the stationary forward hinge arm 28 and in position thereon the main panel 18 is disposed against the front side of the forward hinge arm 28. The clip 20 is bent downwardly against the back face of the hinge arm 28 and the clip 22 is also bent upwardly against the same back face. The clips 20 and 22 cannot be unfastened while the vehicle door 48 is closed and when the hinge cover 12 is secured on the hinge arm 28 as described. The clips 23 and 24 are pressed outwardly of the main panel 18 a distance, preferably, greater than the space between such main panel 18 when the hinge cover 12 is in place on the vehicle door hinge arm 28 and the drain molding 36 of the automobile body so that pressure is maintained on the cover 12 via such clips 23 and 24 against the drain molding 36.

In the attached position described of the hinge cover 12 the top panel 14 covers the top of the vehicle door hinge including the top of the hinge pintle 30 and the bottom panel 16 covers the bottom of such hinge. The main panel 18 covers the exposed hinge joint area. In the instance the main panel 18 extends outwardly of the automobile body 54 along the front face of the hinge arm 28. At a point outwardly of the shoulder 38 of the hinge arm 28 the main panel 18 is arcuately formed and extends rearwardly and outwardly to a point beyond the shoulder 40 of the hinge arm 26. The side section 18 is held on the hinge arm 28 by the fastening clips 20 and 22. The pressure clips 23 and 24 assist in holding the main panel 18 against the front face of the hinge arm 28. The outer edge of the main panel 18 is disposed in close proximity to the forward part of the back face of the hinge arm 26 and provides the minimum gap needed for free movement of the hinge arm 26. This gap is determined by the thickness (at such outer edge of the main panel 18) of the hinge arm 26 in the open position of the vehicle door 48. The inner fixed side of the exposed hinge joint area as defined by the shoulder 38 is guarded against entrance of foreign elements from such side by the main panel 18 being held on the hinge arm 28 by the fastening clips 20 and 22 and by being pressed against the front face of such hinge arm 28 due to the reaction of the clips 23 and 24 against the drain molding 36. The outer movable side of the exposed hinge joint area as defined by the shoulder 40 is guarded against entrance of foreign elements from such side by the proximity of the outer edge of the main panel 18 to the back face of the hinge 26 as described. Strip seal means (not shown), such as a rubber wiper member, may be provided on such outer edge of the side section 18 to further obstruct such entrance of foreign elements. The same type seal means may be provided on the top and bottom panels 14 and 16 and even on the main panel 18 at the shoulder 38 if desired. Such seal means would also serve as lubricant retention means and as additional antirattle means.

The hinge cover 12 may be made of stainless steel or most any other material of construction. A pleasing appearance can also be provided by chrome or other metal plating on the exterior surfaces of ordinary steel on the cover 12. Light reflective means may be provided on the exterior wall of the main panel 18 as a safety feature. The cover 12 keeps the hinge in shade and protects the lubricants therefor from direct sunlight. It also prevents condensation of moisture and ice formation on the hinge by itself receiving on its exterior surfaces such condensation and ice formation. While the cover 12 is for the upper right side hinge other covers may be constructed for the three other vehicle side hinges by following the teaching of this patent application of mine. Oftentimes the hinge pintle of the upper hinge at the driver's side is extended upwardly and utilized as a mounting for a side view mirror. For this type hinge the top panel 14 in the case of the hinge cover 12, must be modified as by cutting a part of it away to accommodate the upward extension of the hinge pintle on this type hinge.

It will thus be seen that there has been provided by the present invention automotive vehicle side door hinge cover means in which the object hereinabove set forth, together with many other thoroughly practical advantages, has been successfully achieved. While a preferred embodiment of my invention has been shown and described it is to be understood that variations and changes may be resorted to without departing from the spirit of the invention as defined in the appended claim.

I claim:

1. An automotive vehicle side door hinge cover member for use on an automotive vehicle exterior side door hinge, said hinge having a pair of forward and rearward hinge arms extending outwardly from the vehicle body and a hinge pin pivotally joining said hinge arms and forming a hinge joint exterior of the vehicle, the forward hinge arm stationary and the rearward hinge arm movable with the vehicle door, said hinge cover member constructed to be detachably affixed to the forward hinge arm when the vehicle door is opened and so that it cannot be removed therefrom when the vehicle door is closed, said hinge cover member having a main panel which covers the front face of said forward hinge arm, the inner edge of said main panel contoured to conform to the exterior of the vehicle body over the height of said hinge cover member, the outer portion of said main panel extending arcuately outwardly and rearwardly to cover the front half of said hinge joint, said hinge cover member having top and bottom panels integral with said main panel and at right angles thereto which cover at least in part the top and bottom faces, respectively, of said forward hinge arm, a rearwardly extending bend-over fastener spring clip on each of said top and bottom panels for detachably fastening said hinge cover member to said forward hinge arm, said main panel having forwardly projecting pressure spring clips which prevent rattling of said hinge cover member when in place on said forward hinge arm covering the front face of said forward hinge arm and the front half of said hinge joint.

References Cited

UNITED STATES PATENTS

| | | | |
|---|---|---|---|
| 2,047,909 | 6/1956 | North | 16—148 |
| 2,151,240 | 3/1939 | Soss | 16—148 |
| 3,081,853 | 3/1963 | Buttriss | 24—73 |
| 2,200,253 | 5/1940 | Atwood | 16—148 |

BOBBY R. GRAY, *Primary Examiner.*

DORIS L. TROUTMAN, *Assistant Examiner.*